US011215816B2

(12) United States Patent
Xu

(10) Patent No.: US 11,215,816 B2
(45) Date of Patent: Jan. 4, 2022

(54) BEAM CONTROL APPARATUS

(71) Applicant: Weike Xu, Weihai (CN)

(72) Inventor: Weike Xu, Weihai (CN)

(*) Notice: Subject to any disclaimer, the term of this patent is extended or adjusted under 35 U.S.C. 154(b) by 143 days.

(21) Appl. No.: 16/700,120

(22) Filed: Dec. 2, 2019

(65) Prior Publication Data
US 2020/0103643 A1 Apr. 2, 2020

Related U.S. Application Data

(63) Continuation of application No. PCT/CN2018/091886, filed on Jun. 19, 2018.

(51) Int. Cl.
*G02B 26/08* (2006.01)
*G02B 26/10* (2006.01)
*H04B 10/11* (2013.01)

(52) U.S. Cl.
CPC ....... *G02B 26/101* (2013.01); *G02B 26/0816* (2013.01); *G02B 26/106* (2013.01); *G02B 26/108* (2013.01); *H04B 10/11* (2013.01)

(58) Field of Classification Search
CPC .............. G02B 26/101; G02B 26/0816; G02B 26/106; G02B 26/108; H04B 10/11; F21V 14/00; G02F 1/00; G02F 1/29; G02F 1/0081; G02F 1/292
USPC ...................................................... 359/221.2
See application file for complete search history.

(56) References Cited

U.S. PATENT DOCUMENTS

| 9,036,262 | B2 | 5/2015 | Staver et al. |
| 2002/0181839 | A1* | 12/2002 | Brown ................. G02B 26/105 385/16 |
| 2009/0161240 | A1 | 6/2009 | Chang |
| 2015/0316376 | A1 | 11/2015 | Williams |

FOREIGN PATENT DOCUMENTS

| CN | 101108279 A | 1/2008 |
| CN | 201438957 U | 4/2010 |
| CN | 102175235 A | 9/2011 |
| CN | 105783897 A | 7/2016 |

OTHER PUBLICATIONS

Internation Search Report of PCT/CN2018/091886, dated Nov. 14, 2018.

* cited by examiner

*Primary Examiner* — Euncha P Cherry

(57) ABSTRACT

A beam control apparatus consists of an electromagnetic field control component, which has a spherical cavity encircled by a transparent spherical shell, and a beam directing component, which is spherical in shape and located in the spherical cavity. The two components can rotate relative to each other. A clearance between the two components could be filled with lubricant. The beam directing component has a magnetic moment or an electric dipole moment. A controller controls a magnetic field or an electric field in the spherical cavity of the electromagnetic field control component to exert a torque on the beam directing component to control a direction of the beam directing component, thereby controlling a direction of an emergent beam. The present invention is a new terminal technology for free space optical communications, laser scanning, unmanned driving, laser beam driving and location identification.

15 Claims, 11 Drawing Sheets

BEAM CONTROL APPARATUS

CROSS-REFERENCE TO RELATED APPLICATIONS

This application is a continuation of International Patent Application No. PCT/CN2018/091886 with a filing date of Jun. 19, 2018, designating the United States, now pending, and further claims priority to Chinese Patent Application No. 201710553949.8 with a filing date of Jul. 9, 2017. The content of the aforementioned applications, including any intervening amendments thereto, are incorporated herein by reference.

TECHNICAL FIELD

The present invention relates to the field of beam direction control, and particularly relates to the field of free space optical communications.

BACKGROUND OF THE PRESENT INVENTION

The technology for controlling the directive emission of beams has important applications in various fields. For example, in the fields of automatic driving and laser surveying and mapping, a laser scanning technology is one of the key technologies. The work to be accomplished by the laser scanning is to control the direction of laser beams to be changed according to a designed trajectory, and to obtain the morphological information of a detected environment or object according, to a reflected laser signal. In the laser beam driving field, laser beams as energy transmission, carriers are emitted from a light source to a photoelectric, converter of a receiving end to complete the energy transmission. To improve the energy transmission efficiency, the laser beam needs to be accurately directed to the receiving end. At present, the laser beam direction control apparatuses used in these fields are all based on the traditional motor servo control and are difficult in miniaturization and relatively high in maintenance cost.

The technology for controlling the directive emission of the beams may also have important applications in the wireless communication field. The frequency selection of the existing wireless communications is a trade-off between the signal penetration performance and communication bandwidth. If the frequency is higher, the penetration performance and the obstacle bypassing capacity become poorer and are even similar to those of the visible light that requires a rectilinear pathway. If the frequency is lower, the bandwidth is too narrow to support the communication needs. The existing 4G technology and WIFI technology have already reached a theoretical bandwidth upper limit of the used carrier frequency. To further increase the bandwidth, a technology for a single user to share multiple channels is even provided, which is limited by the density of access users, and the increase of the bandwidth is limited; and moreover, the method for increasing the communication bandwidth within the existing technological framework has negative effects of worsening an electromagnetic environment, aggravating the electromagnetic pollution and making the adverse effect of the wireless communication on the health of the human body increasingly acute. The 5G technology under development is planned to use a carrier wave of centimeter or even millimeter wavelengths. The theoretical bandwidth can be increased by an order of magnitude on the basis of 4G. However, the penetration performance and the obstacle bypassing capacity of radio waves of the wavelengths are poor and a rectilinear pathway is almost required between a mobile terminal and a signal base station. If a 5G system is to be fully built, it is bound to build more base stations and increase the power of the base stations. If the existing signal transmission mode of large-angle broadcasting continues to be used, it will be even worse for the electromagnetic environment that is already severe at present. It can be said that the existing wireless communication technologies such as mobile phones, WIFI and the like face the bottleneck of communication bandwidth.

The development of mobile Internet and Internet of things will pose higher requirements for the communication bandwidth. Increase of the carrier frequency is an only way. However, since the electromagnetic waves with higher frequency are poorer in penetration performance and the obstacle bypassing capacity, a visible pathway is required between the mobile terminal and the signal base station or between two terminals. Whether centimeter waves, millimeter, waves, infrared light or visible light is used as a carrier wave, the visible pathway will be an important feature in future wireless communication. An important application of the present invention is to establish a visible pathway for free space communication with a space angle that is as small as possible and to reduce the influence of communication links on the electromagnetic environment.

In the patent CN02824048—an optical switching device of beam control, a beam, directing control apparatus combining optical fibers and a lens is described. An output end of each optical fiber is controlled by an inching control unit to move on a focal plane of the lens, thereby controlling the direction of light beams emitted from the lens; however, since the outgoing end of the optical fiber needs to be located on the focal plane of the lens, the scope of the light beam direction controlled by the method is limited to a certain extent, and a divergence angle of the light beam is also difficult to control accurately.

In the patent CN200310108487—a precision rotation biprism beam scanner and a control method thereof, a system for controlling the light beam direction by using two refracting prisms. Each prism needs independent servo control, so that the system is complicated and difficult to be miniaturized.

In the patent CN200810005420—perpendicular dynamic beam shaping, useful ideas and concepts about a next generation communication system based on the free space optical communication are described. The optical communication is an upgrade of the existing wireless communication and can provide a larger bandwidth and lower delay than the existing wireless communication. However, restricted by free space optical interconnection technologies, no commercial product for public use exists at present.

The above description is partially representative of the prior art. In general, at present, the technologies for implementing the directive emission of beams can be categorized as follows: 1, motor servo systems or MEMS drivers for controlling the rotation of reflection mirrors or refractive crystals; 2, electronic phased array or optical phased array; and 3, beam deflection by grating diffraction.

If categorized according to its technical principles, the present invention belongs to the technical field of servo control and is a novel servo apparatus for beam direction control.

SUMMARY OF PRESENT INVENTION

Technical Problems

The existing motor servo systems or MEMS technologies used for three-dimensional spatial directing servo have the problems of complexity in system and limited angle range. The phased array technology has a limited deflection angle range due to technical characteristics of its own. Especially the existing optical phased array technology has relatively small deflection angle of light beams. Blazing, gratings have different diffraction angles for electromagnetic waves of different wavelengths, so that the directive emission of light beams can be realized by using the principle. However, since the wavelength of light waves is bound to azimuth angles of the light beams, the requirement for adjusting light wave frequency is relatively high, accurate wavelength control is required at an emitting end, and the deflection angle is also limited.

In the prior art, the beam direction control has the defects of complicated structure, difficulty in miniaturization, high maintenance cost and limited beam deflection angle.

Solutions for Problems

Technical Solutions

For the defects in the prior art, the present invention accomplishes a lot of technical breakthroughs. For example, the present invention calculates and verifies energy consumption and intensity of a magnetic field generated by conductive coils on the surface of Earth, and identifies the feasibility, reliability and visibility for controlling deflection of a magnetic component by a magnetic field generated by the conductive coil. The present invention proposes a feasible solution for controlling an orientation of a beam directing component through electrostatic actuation according, to the capacitance variable principle, realizes the speed negative feedback control of the beam directing component according to the principle that the sliding friction force of the lubricating fluid is proportional to the relative speed, and adjusts a speed feedback coefficient by selecting the viscosity of lubricating fluid and a thickness of a lubricating layer to solve the potential control stability problem caused by the fact that the electromagnetic magnetic field control component can only output the position control. The present invention solves the problem of static frictions by using a pulse width modulation technology.

To achieve the above purposes, the present invention adopts the following technical solutions.

A beam control apparatus is provided with a beam directing component and an electromagnetic field control component.

The beam directing component is spherical in appearance shape. The electromagnetic field control component is provided with a spherical cavity. The beam directing component is located in the spherical cavity of the electromagnetic field control component and can rotate relative to the electromagnetic field control component.

The beam directing component is provided with a luminous element, a reflective surface, a refractive medium or a diffraction grating. An emergent beam is obtained by virtue of the reflection of the luminous element, the reflection of the reflective surface, the refraction of the refractive medium or the diffraction of the diffraction grating. A direction of the emergent beam is determined by the orientation of the beam directing component.

The beam may be an electromagnetic wave of any wavelength. The beam directing component and the electromagnetic field control component are transparent or partially transparent in a beam waveband on a beam pathway.

The beam directing component is provided with an electromagnetic moment component. The electromagnetic moment component generates an electric dipole moment or a magnetic moment.

The electromagnetic field control component is connected with the controller. The controller controls an electric field in the spherical cavity of the electromagnetic field control component to apply an electric torque to the electric bipole moment of the electromagnetic moment component of the beam directing component, or controls the magnetic field in the spherical cavity of the electromagnetic field control component to apply a magnetic torque to the magnetic moment of the electromagnetic moment component of the beam directing component, so as to control the direction of the beam directing component, thereby controlling the direction of the emergent beam.

Optionally, the clearance between the beam directing component and the spherical cavity of electromagnetic field control component is filled with a lubricant. The lubricant is fluid or spherical particles, and the lubricant is transparent or partially transparent in the beam waveband.

Optionally, the spherical cavity of the electromagnetic field control component is encircled with two or three groups of conductive coils. Each group of conductive coils is mutually orthogonal and insulated to each other. Each group of conductive coils is electrically connected with a controller. The controller controls the current in each group of conductive coils to control a magnetic field in the spherical cavity. Each group of conductive coils is formed by encircling at least one conductive wire. The conductive wires of the same group of conductive coils are identical in encircling directions and are intensively or dispersedly encircled. A ratio of a total conductive sectional area of each group of conductive coils to an inner surface area of the spherical cavity is not greater than 0.02.

Optionally, the electromagnetic moment component of the beam directing component is a permanent magnet. The permanent magnet generates the magnetic moment.

Optionally, besides the beam directing component and the electromagnetic field control component, the beam control apparatus is also provided with a magnetometer. The magnetometer detects a value of an environmental magnetic field. The controller controls the magnetic field generated by the electromagnetic field control component in the spherical cavity, so that the generated magnetic field in the spherical cavity is equal to the target magnetic field in the spherical cavity minus the environmental magnetic field, thereby offsetting the effect of the environmental magnetic field on the magnetic field of the spherical cavity.

Optionally, the outer side of the spherical cavity of the electromagnetic field control component is coated with multiple pairs of electrodes. Each pair of electrodes is electrically connected with the controller. The controller controls the voltage of each pair of electrodes to control the electric field in the spherical cavity. The electrodes are transparent or partially transparent in the beam waveband on the beam pathway.

Optionally, the electromagnetic moment component of the beam directing component is a pair of electrodes or multiple pairs of electrodes, the electrodes are transparent or partially transparent in the beam waveband on the beam pathway. Each pair of electrodes is insulated to other portions of the present invention. Each pair of electrodes comprises two electrodes located on the inner side of the spherical surface of the beam directing component and a conductor connecting the two electrodes, thereby inducing the electric dipole moment in the electric field.

Optionally, the electromagnetic moment component of the beam directing component is a pair of electrodes or multiple pairs of electrodes. The electrodes are transparent or partially transparent in the beam waveband on the beam pathway. Each pair of electrodes is insulated to other portions of the present invention. Each pair of electrodes comprises two electrodes located on the inner side of the spherical surface of the beam directing component. The two electrodes are mutually insulated to each other and have an equal amount of opposite charges, thereby generating the electric dipole moment.

Optionally, each electrode of the beam directing component is circular or regularly polygonal. The surface area of each electrode is greater than 0.5% of the area of the outer spherical surface of the beam directing component.

A distance from each electrode of the beam directing component to the spherical outer surface of the beam directing component is less than 1 mm. A distance from each electrode of the electromagnetic field control component to the inner surface of the spherical cavity is less than 1 mm.

The electrodes of the electromagnetic field control component and the beam directing component are made of indium tin oxide (ITO), indium zinc oxide (IZO), a graphite film, or a metal film.

Optionally, the beam directing component has a reflection surface. The reflection surface is a plane mirror, a concave mirror or a convex mirror. The reflection surface is located in the middle part of the beam directing component. The reflection surface is perpendicular to a direction of the electric dipole moment or magnetic moment of the electromagnetic moment component of the beam directing component.

Optionally the beam directing component has a luminous element. The emergent beam is emitted by the luminous element. The direction of the emergent beam is parallel to the direction of the electric dipole moment or the direction of the magnetic moment of the electromagnetic moment component of the beam directing component. The beam directing component also has a photosensitive element capable of receiving an optical signal, a magnetic field induction coil capable of receiving a magnetic field signal or an electric field induction antenna capable of receiving an electric field signal. The luminous element is connected with the photosensitive element, the magnetic field induction coil or the electric field induction antenna. The luminous element controls the intensity, wavelength, phase or polarization state of the emergent beam according to the optical signal received by the photosensitive element, the magnetic field signal received by the magnetic field induction coil or the electric field signal received by the electric field induction antenna.

Optionally, the electromagnetic field control component controls the electric field or magnetic field in the spherical cavity in a pulse width modulation mode, i.e. a PWM mode.

Optionally, besides the beam directing component and the electromagnetic field control component, the beam control apparatus also has a beam direction detection component. The direction of one or a plurality of external incoming light beams are detected by the beam direction detection component. The controller controls the beam control apparatus, in a way that the direction of the emergent beam is a specific function of the direction of the external incoming light beams.

Optionally, a difference between an outer diameter of the beam directing component and an inner diameter of the spherical cavity of the electromagnetic field control component is less than 2 mm. A distance between the gravity center and a sphere center of the beam directing component is less than 10% of the outer diameter. A ratio of an average density of the beam directing component to the density of the lubricating medium is 0.9 to 1.1.

Optionally, each electrode of the beam directing component is circular or regularly polygonal. The surface area of each electrode is greater than 0.5% of the area of the outer spherical surface of the beam directing component.

A distance from each electrode of the beam directing component to the spherical outer surface of the beam directing component is less than 1 mm. A distance from each electrode of the electromagnetic field control component to the inner surface of the spherical cavity is less than 1 mm.

The electrodes of the electromagnetic field control component and the beam directing component are made of indium tin oxide (ITO), indium zinc oxide (IZO), a graphite film, or a metal film.

BENEFICIAL EFFECTS OF THE INVENTION

Beneficial Effects

Based on the above technical solutions, the present invention implements a beam control apparatus and has the following prominent technical effects: (1) all movable components of the present invention are designed as completely-closed structures, so that the maintenance is avoided, and the problems of dust entering a bearing or a rotor, failure of lubricating fluid, etc. in the existing servo control can be avoided; (2) the present invention is simple in structure and can be miniaturized; (3) the beam deflection angle of the present invention is not actually limited, and the application occasions with relatively high requirements for the beam directing angle range can be satisfied; (4) since the control structure is simple, and the relative weight is light, the beam control apparatus of the present invention is low in power consumption while working and applicable to the application occasions sensitive to the power consumption such as mobile communications; (5) the beam control apparatus of the present invention could be controlled by the pulse width modulation (PWM) mode, so that the driving actuators could be simple, and the static frictions can be overcome due to the characteristics of the pulse width modulation mode; and (6) the emergent beam in the beam directing component of the present invention can be emitted in various ways, so that the universality and flexibility are good.

BRIEF DESCRIPTION OF THE DRAWINGS

Description of the Drawings

In order to describe the technical solutions in the embodiments of the present invention or in the prior art more clearly, the drawings to be used in the illustration of the embodiments or the prior art are explained concisely below. Obviously, the drawings described below are only some embodiments of the present invention. For those ordinary skilled in the art, other drawings can also be obtained according to the provided drawings without contributing creative labor.

Figure 1:
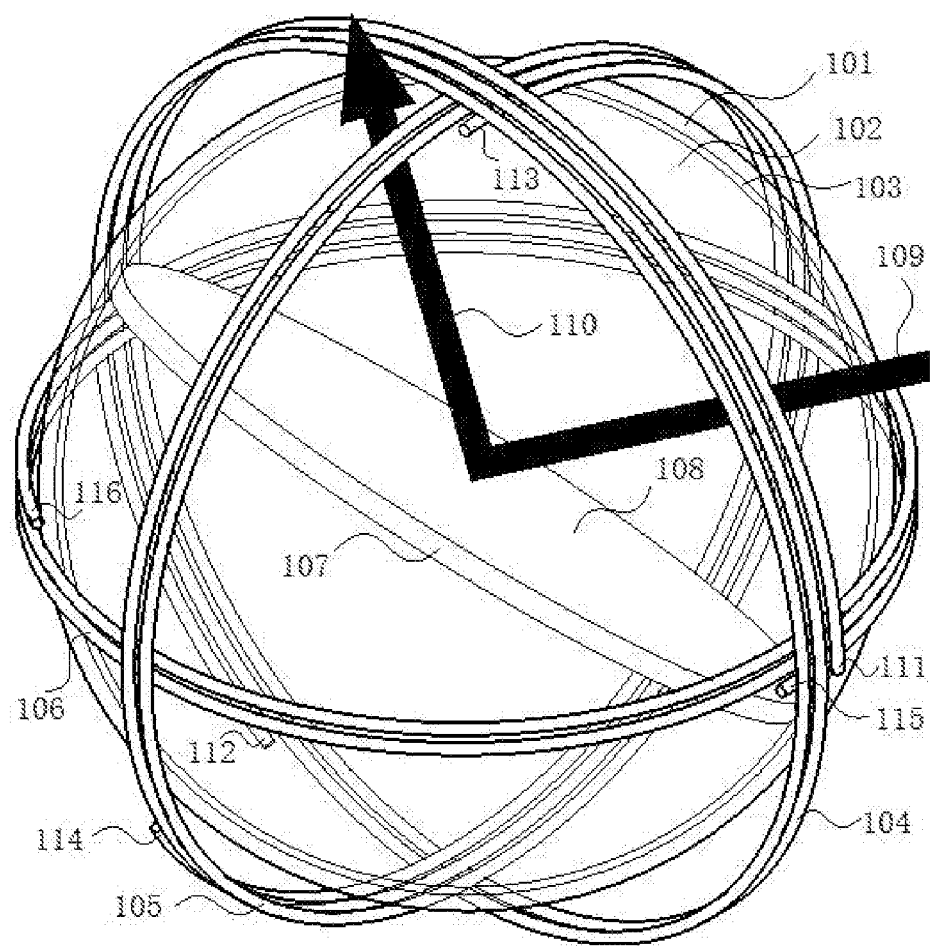
Figure 2:
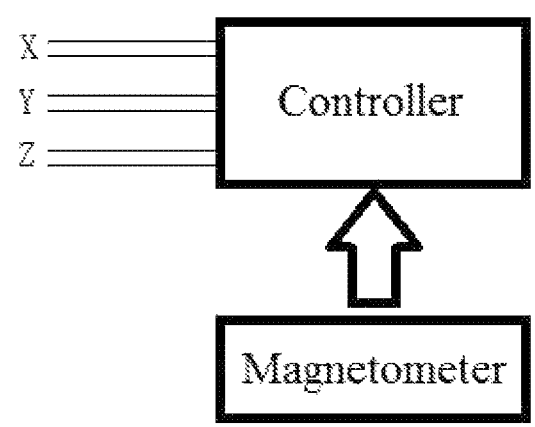
Figure 3:
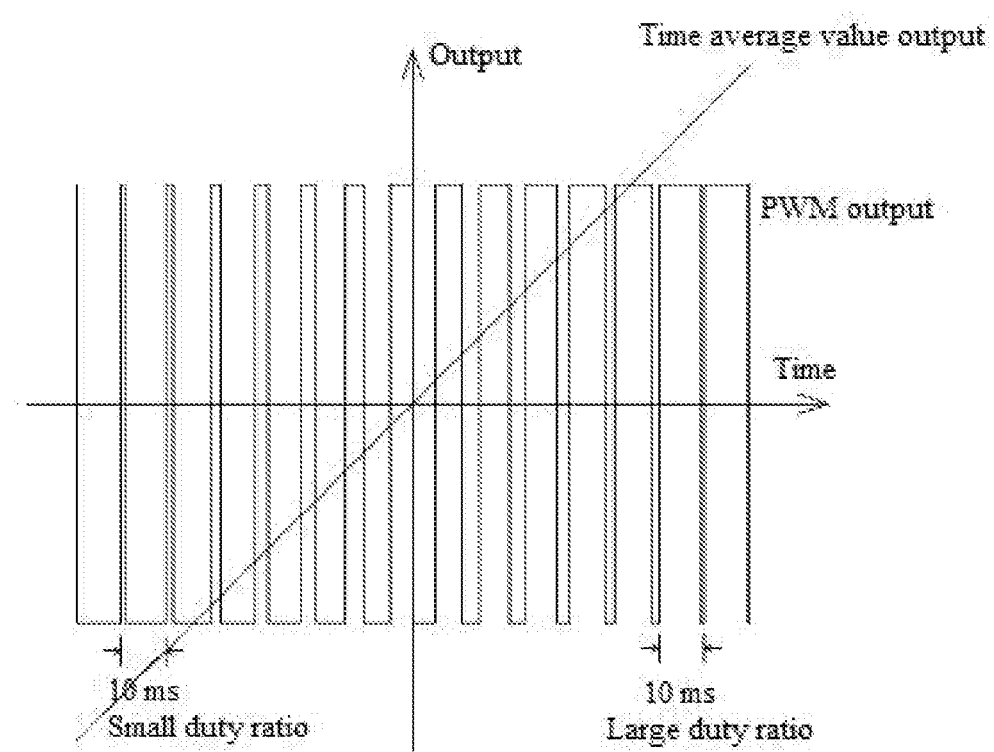
Figure 4:
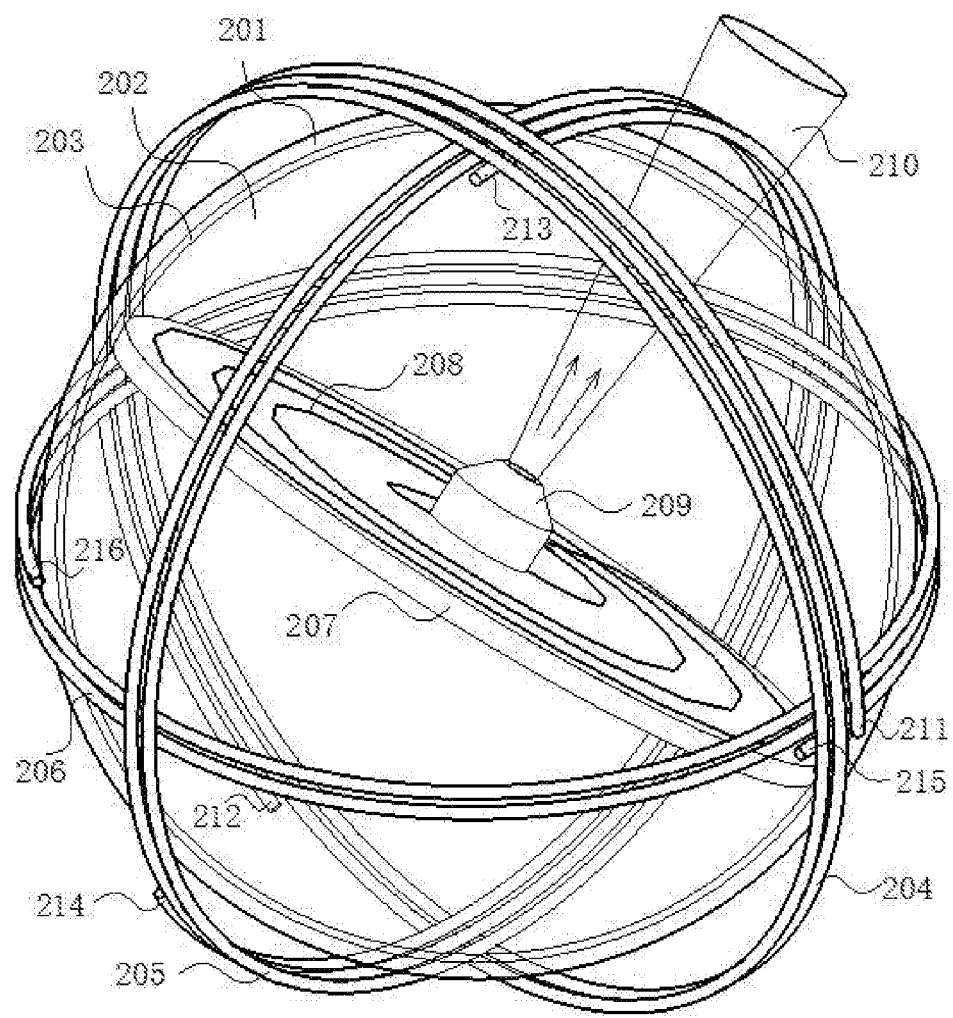
Figure 5:
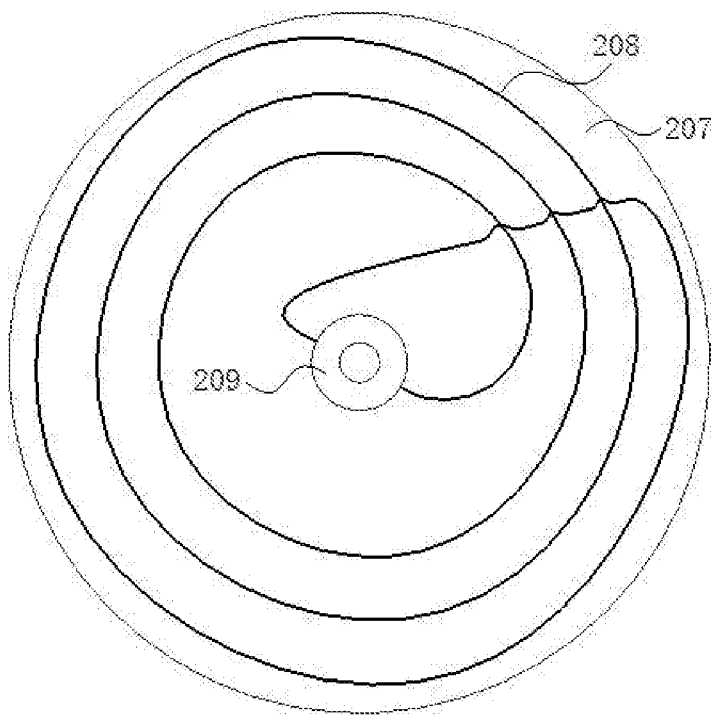
Figure 6:
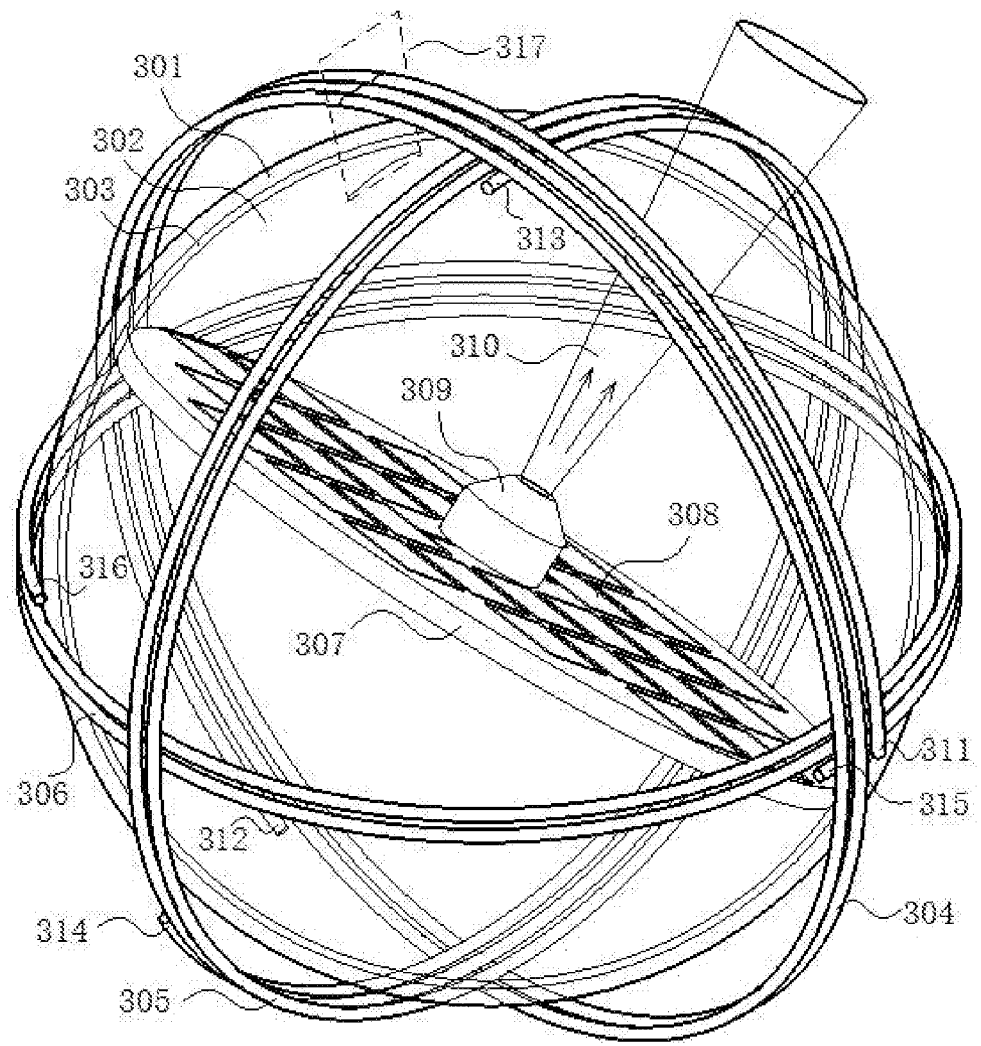
Figure 7:
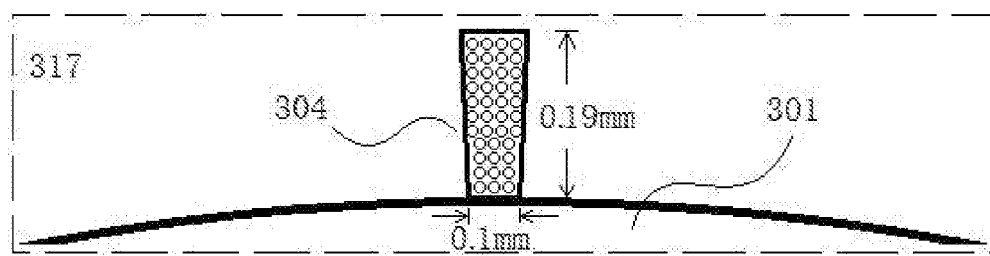
Figure 8:
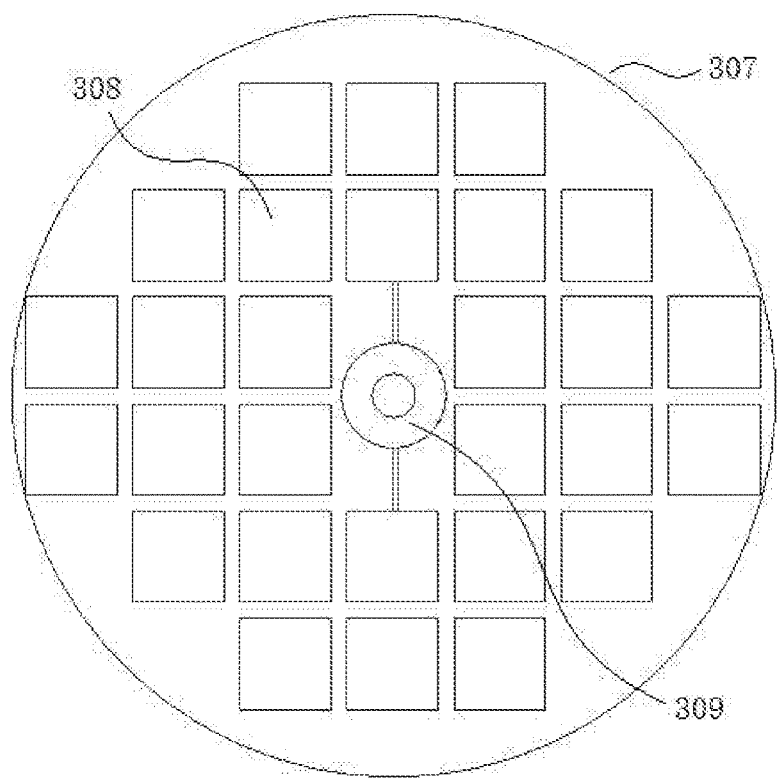
Figure 9:
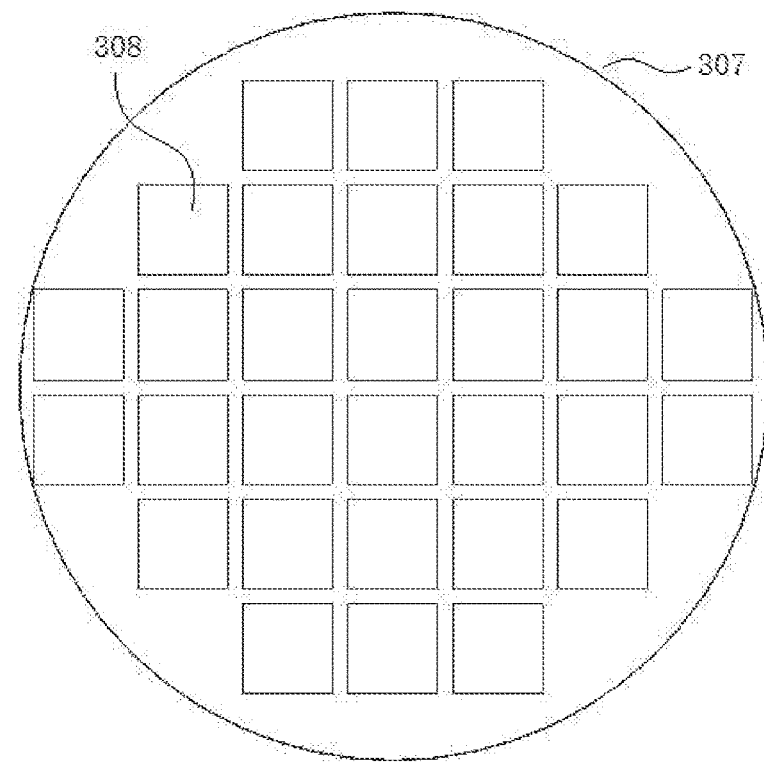
Figure 10:
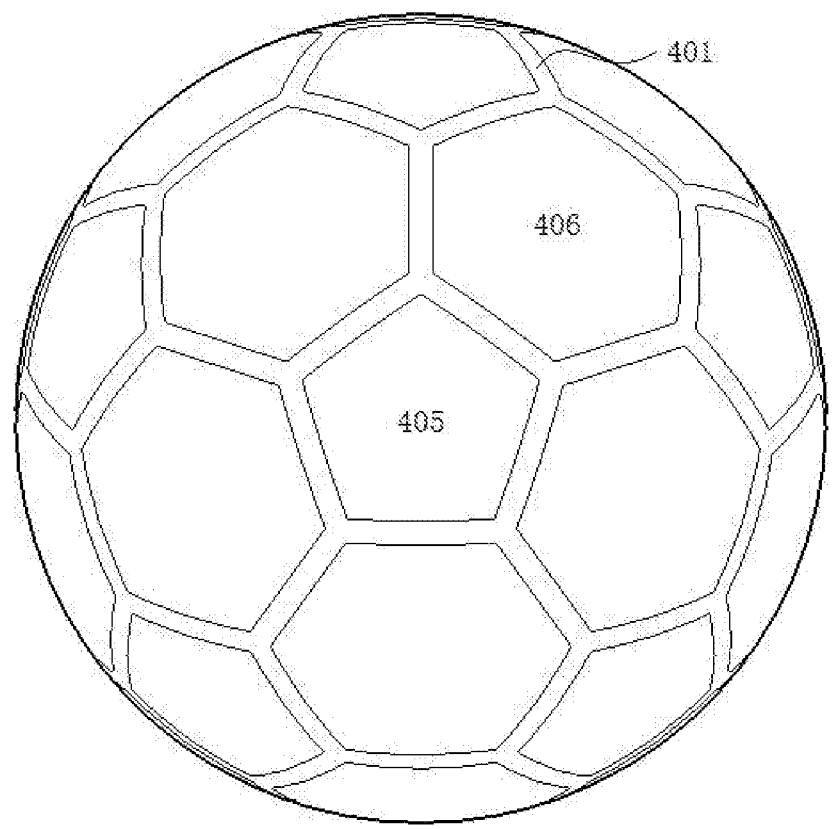
Figure 11:
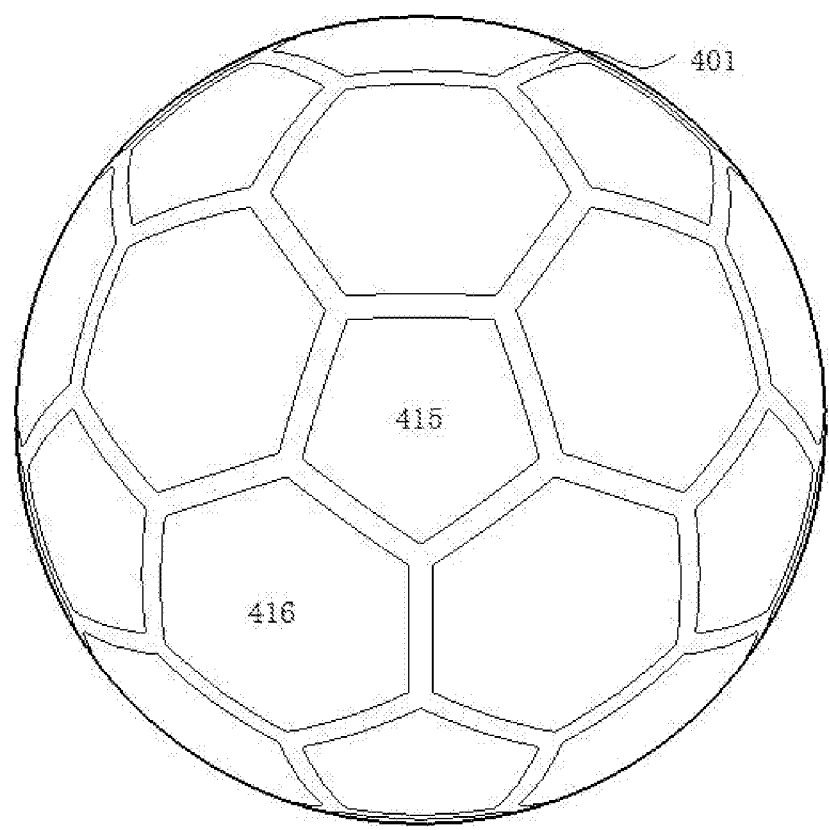
Figure 12:
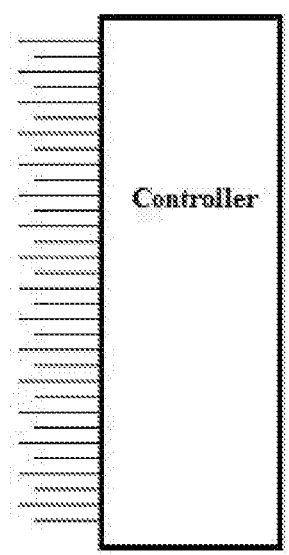
Figure 13:
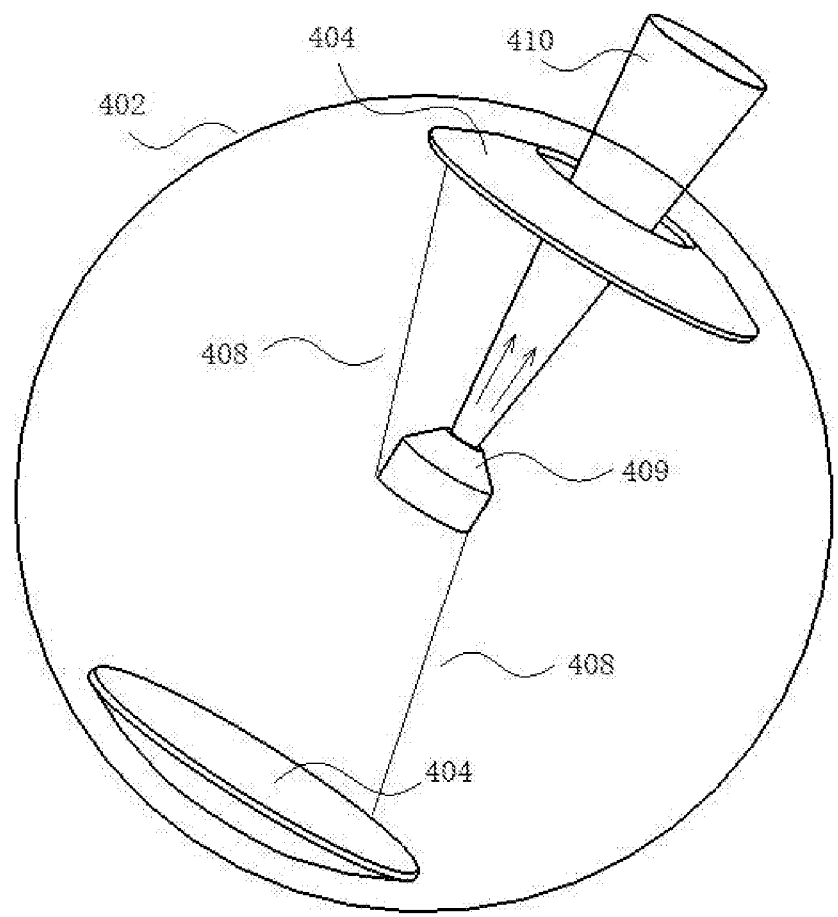
Figure 14:
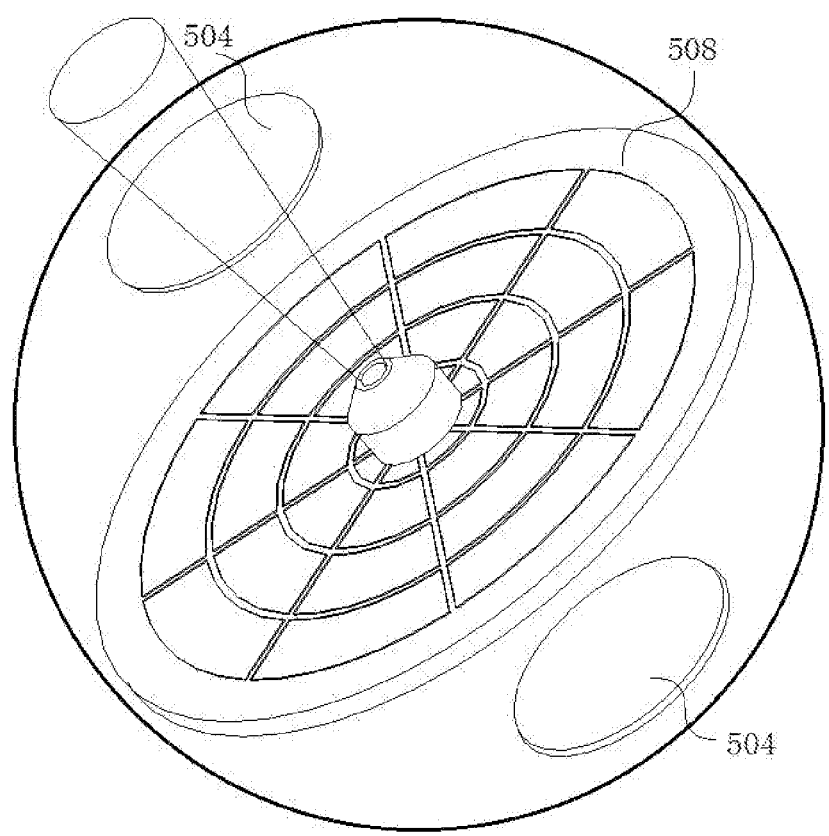
Figure 15:
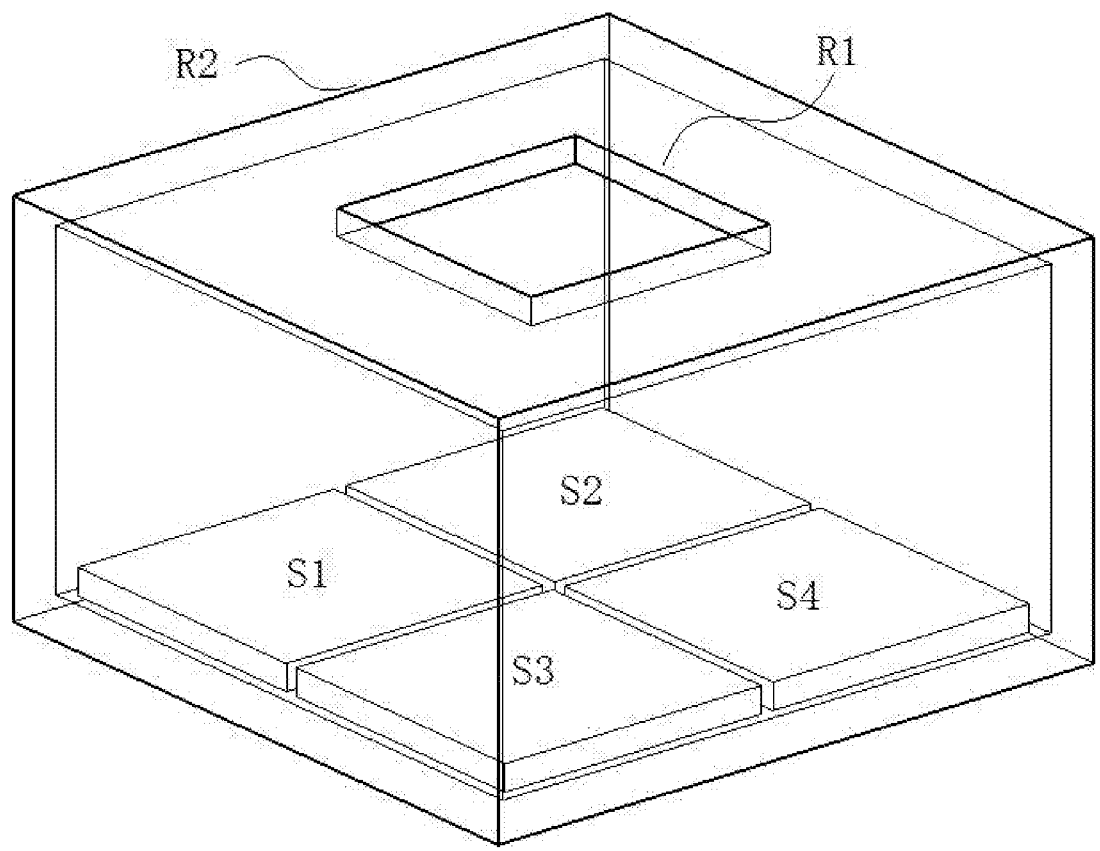

FIG. 1 is a schematic diagram of embodiment I of the present invention;

FIG. 2 is a schematic diagram of a controller and a magnetometer of the present invention;

FIG. 3 is a schematic diagram of a PWM technology;

FIG. 4 is a schematic diagram of embodiment II of the present invention;

FIG. 5 is a top view of a beam directing component of embodiment II of the present invention;

FIG. 6 is a schematic diagram of embodiment III of the present invention;

FIG. 7 is a section view of a position 317 of embodiment III of the present invention;

FIG. 8 is a top view of the beam directing component of embodiment III of the present invention;

FIG. 9 is a bottom view of the beam directing component of embodiment III of the present invention;

FIG. 10 is a front view of an electromagnetic field control component of embodiment IV of the present invention;

FIG. 11 is a rear view of an electromagnetic field control component of embodiment IV of the present invention;

FIG. 12 is a schematic diagram of a controller of embodiment IV of the present invention;

FIG. 13 is a schematic diagram of a beam directing component of embodiment IV of the present invention;

FIG. 14 is a schematic diagram of a beam directing component of embodiment V of the present invention; and FIG. 15 is a schematic diagram of a beam direction detection component of, embodiment II of the present invention.

PREFERRED EMBODIMENTS FOR IMPLEMENTING THE INVENTION

Preferred Embodiments of the Invention

Embodiment I

As shown in FIG. 1, a beam control apparatus includes a beam directing component and an electromagnetic field control component. To clearly show each portion, FIG. 1 is not drawn strictly according to a proportion. The electromagnetic field control component consists of a transparent spherical shell 101, a conductive coil 104, a conductive coil 105 and a conductive coil 106. The conductive coil 104, the conductive coil 105 and the conductive coil 106 are fixed on the outer side of the transparent spherical shell 101. The inner side of the transparent spherical shell 101 is a spherical cavity of the electromagnetic field control component. The beam directing component consists of a transparent spherical shell 102, a permanent magnet disc 107 and a reflection surface 108. The permanent magnet disc 107 and the reflection surface 108 are fixed with the transparent spherical shell 102.

The transparent spherical shell 102 is located inside the transparent spherical shell 101. The transparent spherical shell 101 of the electromagnetic field control component has an outer diameter of 30 mm and an inner diameter of 27 mm; the transparent spherical shell 102 of the beam directing component has an outer diameter of 26 mm, i.e. a uniform, clearance 103 exists between the transparent spherical shell 101 of the electromagnetic field control component and the transparent spherical shell 102 of the beam directing component. A thickness of the uniform clearance 103 is 0.5 mm, and a lubricant filling the uniform clearance is water. The transparent spherical shell 101 and the transparent spherical shell 102 are made of transparent quartz glass.

Planes on which the conductive coil 104, the conductive coil 105 and the conductive coil 106 are located pass the sphere center of the transparent spherical shell 101. The three groups of, conductive coils are mutually perpendicular to one another and wound outside the transparent spherical shell 101 and are completely fixed with the transparent spherical shell 101 by a fixing slot or curable adhesive. The conductive coil 104, the conductive coil 105 and the conductive coil 106 are respectively a single enameled oxygen-free copper wire. In FIG. 1, to clearly explain the embodiment, the wire thicknesses of the conductive coil 104, the conductive coil 105 and conductive coil 106 are exaggerated; and the numbers of winding turns are reduced. Actually, the conductive coil 104, the conductive coil 105 and the conductive coil 106 are all formed by densely winding a single thin enameled wire. The three enameled wires are identical in specifications. A diameter of a conductive copper core of each enameled wire is 0.05 mm. The wire diameter of the enameled wire including its insulation coating is 0.07 mm; the number of winding turns is 300; a length of each enameled wire is 28.5 m to 29 m; and the resistance is about 250 Ohm. The wire diameter of the coil formed by winding each enameled wire is about 1.2 mm, i.e. a macro coil thickness of the conductive coil 104, conductive coil 105 and conductive coil 106 is about 1.2 mm.

The permanent magnet disc 107 of the beam directing component is in a shape of a wafer with a diameter of 24 mm and a thickness of 4 mm, and is located at the center of the transparent spherical shell 102 and fixed with the transparent spherical shell 102. In the present embodiment, the permanent magnet disc 107 is an electromagnetic moment component of the present invention. The permanent magnet disc 107 is made of N38 neodymium iron boron rare-earth permanent magnet, and a magnetizing direction thereof is perpendicular to the plate of the permanent magnet disc 107, that is, the N—S pole direction is perpendicular to the plane of the permanent magnet disc 107. A reflection surface 108 is an ultrathin plane mirror located on the plane of one end of the permanent magnet disc 107, covering the entire plane of one end of the permanent magnet disc 107 and fixed with the transparent spherical shell 102. The reflection surface 108 reflects an incident beam 109 to obtain an emergent beam 110. The thickness of the transparent spherical shell 102 is not less than 1 mm, and the actual thickness is determined according to the requirement of the average density of the beam directing component, i.e. according to the material of the transparent spherical shell 102, the thickness of the transparent spherical shell 102 should make the average density of the beam directing component calculated to be equal to the density of the lubricant in the uniform clearance 103. Since the lubricant of the present embodiment is water, the thickness of the transparent spherical shell 102 shall make the average density of the beam directing component equal to 1 g/cm$^3$. The thickness of the transparent spherical shell 102 shall be uniform enough, so that a mass center of the whole beam directing component is located at the center of sphere.

The controller is shown in FIG. 2. A terminal 111 and a terminal 112 of the conductive coil 104 are connected to a port X of the controller; a terminal 113 and a terminal 114 of the conductive coil 105 are connected to a port Y of the controller; and a terminal 115 and a terminal 116 of the conductive coil 106 are connected to a port Z of the controller. Signal outputs of the controller are current signals. The controller controls the current between the terminal 111 and the terminal 112, i.e. controls the current in the conductive coil 104. The controller controls the current between the terminal 113 and the terminal 114, i.e. controls the current in the conductive coil 105. The controller controls the current between the terminal 115 and the terminal 116, i.e. controls the current in the conductive coil 106. A current control range of the three ports Y and Z of the controller is −12 mA to +12 mA, and a corresponding voltage range is about −3 V to +3 V.

From the appearance of shape, the conductive coil 104, the conductive coil 105 and the conductive coil 106 of the present embodiment are circular conductors, and the current, is circular current. It can be seen from the calculation of electrodynamics that the direction of the magnetic field on the central axis of the circular current is along the axis and meets the right-hand rule. The magnetic flux density B is $$B = \frac{\mu}{2} \cdot \frac{r^2 I}{(r^2 + x^2)^{3/2}}$$

In the above formula, r is, a radius (15 mm) of a ring, I is a total, current (12 mA×300=3.6 A) flowing through a cross section of the circular conductor, x is a distance (0, zero) to the center of the circular conductor, and $\mu$ is a magnetic permeability (in the present embodiment, except for the permanent magnet disc 107, the magnetic permeabilities of materials of other components are approximately equal to the vacuum magnetic permeability; so the vacuum magnetic permeability $\mu=4\pi\times10^{-7}$ N·A$^{-2}$ can be used in the calculation). The magnetic flux density generated by any one of the conductive coil 104, the conductive coil 105 and the conductive coil 106 at the center of the beam directing component may be calculated and may reach $$B = \frac{\mu}{2} \cdot \frac{r^2 I}{(r^2 + x^2)^{3/2}}\bigg|_{x=0} = \frac{\mu I}{2r} = \frac{4\pi \times 10^{-7} \times 3.6}{2 \times 0.015} \approx 1.5 \times 10^{-4} (T)$$

The magnetic flux density of a geomagnetic field on the surface of Earth is about 0.5×10$^{-4}$ T, i.e., even at the center of the current circle, where the magnetic flux density generated by the present embodiment is relatively weak, the magnetic field generated could be much stronger than the geomagnetic field. On the margin near the circular current, much higher magnetic flux density may be generated. The controller controls the current of the conductive coil 104, the conductive coil 105 and the conductive coil 106 to control the magnetic flux density of the spherical cavity inside the transparent spherical shell 101 of the electromagnetic field control component in three dimensional directions. Magnetic fields in various directions may exert various torques on the permanent magnet disc 107 of the beam directing component, driving the plate of the permanent magnet disc 107 to be perpendicular to the direction of the magnetic field generated by the conductive coil 104, the conductive coil 105 and the conductive coil 106, thereby exclusively controlling the directing of the beam directing component. The incident beam 109 is reflected by the reflection surface 108 to obtain the emergent beam 110. The directing of the beam directing component is controlled, i.e., the direction of the reflection surface 108 is controlled, so that the direction of the emergent beam 110 is controlled by the controller.

For the present embodiment, although a calculated upper limit of the magnetic flux density generated by the conductive coil 104, the conductive coil 105 and the conductive coil 106 is of a similar order of magnitude with the magnetic flux density of the geomagnetic field, since the magnetic flux density of the circular current is relatively low at the center while high on the margin, a high directing precision of the beam directing component can be reached without any compensation according to a measurement of a magnetometer. This fact has also been verified by the experiment. When the coil current is only 7 mA, the magnetic fields generated by the conductive coil 104, the conductive coil 105 and the conductive coil 106 can exert a torque large enough on the beam directing component to reach a high directing precision.

To acquire a higher control precision, a preferred solution is that, as shown in FIG. 2, a magnetometer is added, and the magnetometer is fixed relative to the electromagnetic field control component of the beam control, apparatus. The magnetometer measures a three-dimensional magnetic field and sends measured three-dimensional magnetic field values to the controller. When the controller controls the current of the conductive coil 104, the conductive coil 105 and the conductive coil 106, the current output of each coil is the original target current plus a compensation current respectively. The three compensation current values shall satisfy the following conditions: when the currents of the conductive coil 104, the conductive coil 105 and the conductive coil 106 are respectively the compensation current values, the sum of magnetic torques exerted by the environmental magnetic field (mainly the geomagnetic field) on the permanent magnet disc 107 and the magnetic torque exerted by the three circular currents on the permanent magnet disc 107 should be zero.

If the attitude direction of the electromagnetic field control component of the beam control apparatus changes in real time, the three compensation current values generally changes in real time accordingly. In the present embodiment, the three compensation current values when the electromagnetic field control component of the beam control apparatus points to various directions are determined through experiments. Of course, the three compensation current values in all directions could also be directly obtained by magnetic field CAD design software.

It shall be noted that an adequate distance shall be reserved between the magnetometer and the beam control apparatus to prevent the magnetic field generated by the beam control apparatus from influencing the measurement precision of the magnetometer.

A mechanical system unavoidably has friction. The friction in the present embodiment exists between the inner surface of the transparent, spherical shell 101 of the electromagnetic field control component and the outer surface of the transparent spherical shell 102 of the beam directing component. The friction is of two types. The first type is a sliding friction generated by the lubricant (water in the present embodiment). The sliding friction is proportional to the rotation speed of the transparent spherical shell 102 relative to the transparent spherical shell 101 and in opposite direction with the rotation of the transparent spherical shell 102 relative to the transparent spherical shell 101. The sliding friction is required in the present embodiment, because the controller only outputs currents of the conductive coil 104, the conductive coil 105 and the conductive coil 106 corresponding to a target direction (a target magnetic field direction in the present embodiment), which is purely a position control. According to the control theory, for a second-order system, a pure position control is unstable. However, since the sliding friction of the lubricant in the uniform clearance 103 generates a speed negative feedback, the control becomes a control with both a speed negative feedback, and a position negative feedback, i.e., the PI) control, thereby solving the control stability problem. The frictions of a second type are static frictions between the transparent spherical shell 101 and the transparent spherical shell 102. The static frictions are mainly caused by flaws and defects on the surface and the deviation of the average density of the beam directing component, i.e. the deviation of the location of the mass center. The static frictions are harmful to the present embodiment and may result in stuck and unsmooth manner of the beam directing component in the rotation process and deteriorates the final control directing precision. The current is controlled by using a pulse width modulation mode. i.e., PWM mode, so that the problem of static frictions can be solved.

The principle of the pulse width modulation (abbreviated as PWM) technology is to switch a control signal between a control upper limit and a control lower limit, and by controlling a ratio of time duration between the control upper limit and the control lower limit, i.e., a duty ratio, the control output of a required value can be obtained from the view of time average. As shown in FIG. 3, a target output is a ramp signal that rises at constant speed. By adjusting the duty ratio, the time average outputted by the PWM mode is the ramp signal that rises at the constant speed. When the PWM mode is used for control, it is required that the control object should be a second-order or higher-order system. The system of the present invention, is a second-order system mathematically, thus can be controlled by the PWM. The duration of a time slice of the PWM control shall be selected according to the inertia of a controlled system. For the present embodiment, the time slice in a width of 10 ms is used, i.e., a control mode of the controller for the current in the conductive coil 104, the conductive coil 105 and the conductive coil 106 is to adjust a duty ratio of a maximum output to a minimum output within every 10 ms, so that the time average current is the required target current value. Since the current value of the conductive coil 104 the conductive coil 105 and the conductive coil 106 is switched between the upper limit 12 mA and the lower limit −12 mA, the torque exerted on the beam directing component in three dimensions is incessantly switched between the maximum and the reverse maximum. Even if there is some static friction, the static friction can be overcome by the repeatedly switching of the torque, and finally the beam directing component is positioned in the target direction.

The shorter the time slice of the PWM control is, the smaller the jitter amplitude of the control object would be. However, in the present embodiment, the reduction of the length of the time slice is restrained by the self-inductances of the coils and the driving capacity of the controller. Experiments show that when a long time slice of 10 ms is used in the present embodiment, the jitter of the beam directing component is still acceptable. A defect of a PWM mode is that the energy consumption is relatively high. To reduce the energy consumption, the PWM mode could be used intermittently, or in a manner that the PWM control is in combination with a partial ordinary current control and of a partial magnitude rather than a fill scale one switching between the upper and lower current limits.

For the present embodiment, when the conductive coil 104, the conductive coil 105 and the conductive coil 106 have the maximum output at the same time, the power consumption is $$W=RI_s^2 \times 3=250 \times 0.012^2 \times 3=0.108(W)$$

While working, the maximum power consumption of the electromagnetic field control component is about 108 mW, which is relatively small for an apparatus of a size of 3 cm. The apparatus can work continuously for more than 50 hours even if powered by the existing ordinary mobile phone. Moreover, if the PWM control mode is optimized, the power consumption may also be reduced greatly by applying the intermittent PWM mode or the partial PWM mode.

For the present embodiment, although the conductive coil 104, the conductive coil 105 and the conductive coil 106 are not transparent, their blockage of the beam may be neglected due to their fine wire diameters. If the conductive coils are wound dispersedly outside the transparent spherical shell 101 at some interval, their blockage of the beam would be more uniform.

Embodiment II

As shown in FIG. 4, a beam control apparatus includes a beam directing component and an electromagnetic field control component. To clearly show each portion, FIG. 4 is not drawn strictly according to the proportion. The electromagnetic field control component consists of a transparent spherical shell 201, a conductive coil 204, a conductive coil 205 and a conductive coil 206. The conductive coil 204, the conductive coil 205 and the conductive coil 206 are fixed on the outer side of the transparent spherical shell 201. The inner side of the transparent spherical shell 201 is a spherical cavity of the electromagnetic field control component, and the beam directing component is located inside the spherical, cavity. The beam directing component consists of a transparent spherical shell 202, a permanent magnet disc 207, a magnetic field induction coil 208 and a luminous element 209. The permanent magnet disc 207 is fixed inside the transparent spherical shell 202. The magnetic field induction coil 208 and the luminous element 209 are fixed on the permanent magnet disc 207.

The transparent spherical shell 202 is located inside the transparent spherical shell 201. The transparent spherical shell 201 of the electromagnetic field control component has an outer diameter of 6.0 mm and an inner diameter of 5.4 mm; and the transparent spherical shell 202 of the beam directing component has an outer diameter of 5.2 mm, i.e., a uniform clearance 203 exists between the transparent spherical shell 201 of the electromagnetic field control component and the transparent spherical shell 202 of the beam directing component. A thickness of the uniform clearance 203 is 0.1 mm, and a lubricant filling the uniform clearance is carbon tetrachloride. The transparent spherical shell 201 and the transparent spherical shell 202 are made of transparent polytetrafluoroethylene.

Planes on which the conductive coil 204, the conductive coil 205 and the conductive coil 206 are located pass the sphere center of the transparent, spherical shell 201. The three conductive coils are perpendicular to one another and wound outside the transparent spherical shell 201 and are completely fixed with the transparent spherical shell 201 by a fixing slot or curable adhesive. The conductive coil 204, the conductive coil 205 and the conductive coil 206 are respectively a single enameled oxygen-free copper wire. In FIG. 4, to clearly explain the embodiment, the wire thicknesses of the conductive coil 204, the conductive coil 205 and the conductive coil 206 are exaggerated, and the numbers of encircling turns are reduced. Actually, the conductive coil 204, the conductive coil 205 and the conductive coil 206 are formed by densely winding a single thin enameled wire. The three enameled wires are identical in specifications. A diameter of the conductive copper core of each enameled wire is 0.01 mm. The wire diameter of the enameled wire including the insulation coating is 0.012 mm; the number of encircling turns is 300; the length of each enameled wire is 5.7 in to 5.8 in; and the resistance is about 1250 Ohm. The wire diameter of the coil formed by winding each enameled wire is about 0.24 mm, i.e., the macro coil thickness of the conductive coil 204, conductive coil 205 and conductive coil 206 is about 0.24 mm.

The permanent magnet disc 207 of the beam directing component is in a shape of a wafer with a diameter of 4.8 mm and a thickness of 0.8 mm, and is located at the center of the transparent spherical shell 202 and fixed with the transparent spherical shell 202. In the present embodiment, the permanent magnet disc 207 is the electromagnetic moment component of the present invention. The permanent magnet disc 207 is made of N38 neodymium iron boron rare-earth permanent magnet, and the magnetizing direction thereof is perpendicular to the plate of the permanent magnet disc 207, that is, the N—S pole direction is perpendicular to planes on two sides of the permanent magnet disc 207. The magnetic field induction coil 208 is fixed on a plane of one side of the permanent magnet disc 207, and both ends of the magnetic field induction coil 208 are electrically connected with two input, ports of the luminous element 209. The magnetic field induction coil 208 senses the variation of a magnetic field and outputs the sensed induction current to the luminous element 209. The luminous element 209 has a laser diode. The laser emission direction is perpendicular to planes on two sides of the permanent magnet disc 207. The luminous element 209 has a demodulation chip. The demodulation chip obtains energy from the induction current outputted by the magnetic field induction coil 208 and supplies working energy to the laser diode of the luminous element 209. Meanwhile, the demodulation chip demodulates information from the induction current outputted by the magnetic field induction coil 208 and controls the luminous intensity of the luminous element 209 according to the information so as to emit an emergent beam 210 containing the information. The thickness of the transparent spherical shell 202 is not less than 0.2 mm, and an actual thickness is determined according to the requirement of the average density of the beam directing component, i.e., according to the material of the transparent spherical shell 202, the thickness of the transparent spherical shell 202 should make the average density of the beam directing component to be equal to the density of the lubricant in the uniform clearance 203. The thickness of the transparent spherical shell 202 shall be uniform enough, so that the mass center of the whole, beam directing component is located at the center of sphere.

The controller is shown in FIG. 2. A terminal 211 and a terminal 212 of the conductive coil 204 are connected to a port X of the controller; a terminal 213 and a terminal 214 of the conductive coil 205 are connected to a port Y of the controller; and a terminal 215 and a terminal 216 of the conductive coil 206 are connected to a port Z of the controller. Signals outputted by the controller are current signals. The controller controls the current between the terminal 211 and the terminal 212, i.e., controls the current in the conductive coil 204. The controller controls the current between the terminal 213 and the terminal 214, i.e., controls the current in the conductive coil 205. The controller controls the current between the terminal 215 and the terminal 216, i.e., controls the current in the conductive coil 206. The current control range of the three ports X, Y and Z of the controller is −2.4 mA to +2.4 mA, and a corresponding voltage range is about −3 V to +3 V.

The conductive coil 204, the conductive coil 205 and the conductive coil 206 of the present embodiment are circular conductive wires. It can be known from a calculation of the electrodynamics that the magnetic flux density generated by any one of the conductive coil 104, the conductive coil 105 and the conductive coil 106 at the center of the beam directing component may reach $$B = \frac{\mu I}{2r} = \frac{4\pi \times 10^{-7} \times 0.0024 \times 300}{2 \times 0.003} \approx 1.5 \times 10^{-4}(T)$$

Therefore, the present embodiment, has the same magnetic flux density with the embodiment I. The same mode with the embodiment I is used. The controller controls the currents of the conductive coil 204, the conductive coil 205 and the conductive coil 206 of the electromagnetic field control component to control the magnetic flux density of the spherical cavity inside the transparent spherical shell 201 of the electromagnetic field control component in three dimensional directions. Thereby a torque is exerted on the permanent magnet disc 207 of the beam directing component, driving the plate of the permanent magnet disc 207 to be perpendicular to the direction of the magnetic field outputted by the conductive coil 204, the conductive coil 205 and the conductive coil 206, thereby exclusively controlling the direction of the beam directing component. Similarly to embodiment I, the present embodiment can also refer to a magnetic field measurement value of a magnetometer and compensate or, correct the currents of the conductive coil 204, the conductive coil 205 and the conductive coil 206 to offset the effect of the environmental magnetic field (mainly the geomagnetic field). Similarly to the embodiment I, the present embodiment may also use an intermittent PWM control mode or a mode taking a partial ordinary control in addition with a partial PWM control to overcome the static frictions.

For the present embodiment, when the conductive coil 204, the conductive coil 205 and the conductive coil 206 have the maximum outputs at the same time, the power consumption is $$W = RI_s^2 \times 3 = 1250 \times 0.0024^2 \times 3 = 0.0216(W)$$

The peak power consumption of the electromagnetic field control component is about 21.6 mW while working; and the power consumption is reduced to ⅕ of that of the embodiment I, of which the size is 30 mm, that is, on the premise of ensuring the same magnetic flux density accessed by the beam directing component, if the size of the present invention based on the magnetic moment is proportionally reduced, the power consumption of the electromagnetic field control component would also be proportionally reduced.

The lubricant carbon tetrachloride and water show small difference in viscosity and are supposed to be identical in viscosity herein. A formula could be derived. In the following formula, 'sliding friction coefficient' is an abbreviation of the sliding friction coefficient between the transparent spherical shell 201 of the electromagnetic field control component and the transparent spherical shell 202 of the beam directing component, divided by the corresponding one of the embodiment I. In the following formula, 'magnetic torque' is an abbreviation of the magnetic torque exerted on the permanent magnet disc 207, divided by the corresponding one of the embodiment I. When all sizes are proportionally reduced (a symbol k is used to indicate the size ratio of the present embodiment to the embodiment I, and k is equal to ⅕), a ratio of the sliding friction coefficient to the magnetic torque proportionally increased, i.e., the following relational expression is satisfied:

$$\text{sliding friction coefficient/magnetic torque} = 1/k = 5$$

The reason is that the sliding friction coefficient based on a rotation angular velocity is in direct proportion to the contact area, in inverse proportion to the clearance thickness, and in direct proportion to the radius of the transparent spherical shell 201 and the transparent spherical shell 202, so that when the size of the entire beam control apparatus is reduced according to the ratio k the sliding friction coefficient becomes $k^2$ of that of embodiment I. Now that the magnetic flux density of the magnetic field is unchanged, and the volume of the permanent magnet becomes $k^3$ of that of embodiment I, so the magnetic moment and the magnetic torque become $k^3$ of those of embodiment I, thereby satisfying the above formula. The consequent effect is equivalent to increasing the speed negative feedback relatively in the PD control. The increase is not conducive to the present invention. However, the unfavorable effect can be eliminated by increasing the density and thickness of the permanent magnet or by increasing the current in the conductive coil 204, the conductive coil 205 and the conductive coil 206, or by appropriately widening the uniform clearance 203.

In the present embodiment, the magnetic field signal sensed by the magnetic field induction coil 208 is generated by the conductive coil 204, the conductive coil 205 and the conductive coil 206 controlled by the controller, i.e., the current in the three coils outputted by the controller simultaneously accomplishes three tasks of: 1, controlling the magnetic flux density in the spherical cavity of the electromagnetic field control component; 2, powering the luminous element 209 via the magnetic field induction coil 208 of the beam directing component by generating an alternating magnetic field; and 3, transmitting a signal through the magnetic field induction coil 208 of the beam directing component to the luminous element 209 by outputting, the alternating magnetic field. The three tasks can be simultaneously implemented on the basis of the frequency division technology, i.e., working frequencies on which the three tasks are based are different, and respectively a low frequency, a medium frequency and a high frequency.

The present embodiment also has a beam direction detection component as shown in FIG. 15. The detection component belongs to the prior art. R2 is a thin-wall box body with a square hole formed on its top. The wall, of R2 is not transparent. The transparent view effect of FIG. 15 is for illustration purpose of showing the internal structure. The bottom of R2 is provided with four rectangular light intensity sensors S1, S2, S3 and S4. When a light beam enters the box body through the hole R1, areas of light spots formed on S1, S2, S3 and S4 by the light beam may be different according to different incident angles, so that the four light intensity sensors are different in output quantity. The direction of the incident light can be computed according to the ratio of signals outputted by the four light intensity sensors. The controller controls the magnetic field of the spherical cavity of the electromagnetic field control component to control the emergent beam of the beam directing component to be in an opposite direction of the incident beam.

Embodiment III

As shown in FIG. 6, a beam control apparatus includes a beam directing component and an electromagnetic field control component. To clearly show each portion, FIG. 6 is not drawn strictly according to the proportion.

The electromagnetic field control component consists of a transparent spherical shell 301, a conductive coil 304, a conductive coil 305 and a conductive coil 306. The inner side of the transparent spherical shell 301 is a spherical cavity of the electromagnetic field control component, and the beam directing component is located in the spherical cavity. The transparent spherical shell 301 of the electromagnetic field control component is made of quartz glass with an outer diameter of 3.0 mm and an inner diameter of 2.7 mm. The conductive coil 304, the conductive coil 305 and the conductive coil 306 are fixed on the outer side of the transparent spherical shell 301. Moreover, planes where the three conductive coils are located pass the sphere center of the transparent spherical shell 301. To clearly explain the present embodiment, the three conductive coils are exaggerated in FIG. 6. Actually, the conductive coil 304, the conductive coil 305 and the conductive coil 306 are formed by densely winding a single silver-enameled wire in respective circular conductive wire grooves. The three conductive wire grooves are fixed on the outer side of the transparent spherical shell 301. A diameter of the conductive silver core of the enameled wire is 0.01 mm. The wire diameter of the enameled wire including the insulation coating is 0.012 mm. The number of encircling turns of each coil is 150, and each enameled wire has a length of 1.45 m to 1.5 m and has a resistance of about 320 Ohm. A cross section of a position 317 in FIG. 6 is shown in FIG. 7. As shown in FIG. 7, the cross section of each conductive wire groove is trapezoidal. A narrow edge is fixed on an outer surface of the transparent spherical shell 301. A width of the narrow edge is 0.1 mm. A trapezoidal height is 0.19 mm, and both waist extension lines of the trapezoid pass through the sphere center of the transparent spherical shell 301. The conducting wire in the conductive wire groove is only exemplary. The actual density of the conductive wires is much higher. At the positions where two conductive wire grooves meet, one conductive wire groove crosses over another.

The beam directing component consists of a transparent spherical shell 302, a permanent magnet disc 307, a photosensitive element 308 and a luminous element 309. The transparent spherical shell 302 has an outer diameter of 2.6 mm and is made of transparent quartz glass. In the present embodiment, the permanent magnet disc 307 is an electromagnetic moment component of the present invention, and, is made of N52 neodymium iron boron rare-earth permanent magnet, and the magnetizing direction thereof is along the thickness direction, i.e., the N-S direction of the permanent magnet is perpendicular to planes on two sides of the permanent magnet disc 307. The permanent magnet disc 307 is, in a shape of a wafer with a diameter of 2.4 mm and a thickness of 0.4 mm, and located at the center of the transparent spherical shell 302 and fixed with the transparent spherical shell 302. As shown in FIG. 8 and FIG. 9, the photosensitive element 308 is fixed on planes of two sides of the permanent magnet disc 307. The luminous element 309 is fixed at the center of a plane on one side of the permanent magnet disc 307. A positive electrode and a negative electrode of the photosensitive element 308 are electrically connected with a positive pole and a negative pole of the luminous element 309 respectively. The luminous element 309 is a VCSEL vertical cavity surface emission laser, whose laser emission direction is perpendicular to the permanent magnet disc 307. The photosensitive element 308 receives an external optical signal and converts the optical signal to an electric signal to directly control the intensity of the emergent beam 310 emitted by the luminous element 309. The thickness of the transparent spherical shell 302 makes the average density of the beam directing component equal to the density of the lubricant in the uniform clearance 303.

The transparent spherical shell 302 of the beam directing component is located inside the spherical cavity of the transparent spherical shell 301 of the electromagnetic field control component. A uniform clearance 303 exists between the transparent spherical shell 301 and the transparent spherical shell 302. A thickness of the uniform clearance 303 is 0.05 mm. The lubricant filling the uniform clearance is pure gasoline (the distilling range is about 150° C.). The uniform clearance is filled with a small amount of transparent polytetrafluoroethylene spherical particles with a diameter of about 10 micrometers.

The controller is shown in FIG. 2. A terminal 311 and a terminal 312 of the conductive coil 304 are connected to a port X of the controller; a terminal 313 and a terminal 314 of the conductive coil 305 are connected to a port Y of the controller; and a terminal 315 and a terminal 316 of the conductive coil 306 are connected to a port Z of the controller. Signals outputted by the controller are current signals. The controller controls the current between the terminal 311 and the terminal 312, i.e., controls the current in the conductive coil 304. The controller controls the current between the terminal 313 and the terminal 314, i.e., controls the current in the conductive coil 305. The controller controls the current between the terminal 315 and the terminal 316, i.e., controls the current in the conductive coil 306. The current control range of the three ports X, Y and Z of the controller is −6 mA to +6 mA, and a corresponding voltage range is about −1.92 V to +1.92 V.

The magnetic flux density generated by any one of the conductive coil 304, the conductive coil 305 and the conductive coil 306 at the center of the present embodiment may reach $$B = \frac{\mu I}{2r} = \frac{4\pi \times 10^{-7} \times 0.006 \times 150}{2 \times 0.0015} \approx 3.7 \times 10^{-4} (T)$$

This value is greater than the geomagnetic field of 0.5× 10⁻⁴ T on earth surface. When the conductive coil 304, the conductive coil 305 and the conductive coil 306 reach their peak outputs at the same time, the total power consumption is $$W = RI_s^2 \times 3 = 320 \times 0.006^2 \times 3 = 0.03456 (W)$$

That is, when the beam control apparatus works, the peak power consumption of the electromagnetic field control component is about 34.56 mW.

The viscosity of the gasoline is about 40% of the viscosity of the water, which is conducive to reduce the sliding friction coefficient between the transparent spherical shell 301 and the transparent spherical shell 302. Moreover, by adding little polytetrafluoroethylene spherical particles, the sliding friction coefficient is further reduced.

The conductive coil 304, the conductive coil 305 and the conductive coil 306 are perpendicular to one another and are responsible for generating a magnetic field in one direction respectively. Mathematically, a target direction of the emergent beam 310 may be represented by a three-dimensional vector. The controller controls the magnitude and direction of the current in the conductive coil 304, the conductive coil 305 and the conductive coil 306 according to the three-dimensional vector, so that the direction of the three-dimensional vector consisting of the magnetic flux density in three directions is the same as the direction of the three-dimensional vector of the target direction of the emergent beam 310. Moreover, to reach higher direction precisions, the absolute value of the current in at least one of the three conductive coils reaches the maximum current of 6 mA.

A magnetometer as shown in FIG. 2 is fixed relative to the electromagnetic field control component. The magnetometer sends the measured three-dimensional magnetic field data to the controller. When, the controller controls the current of the conductive coil 304, the conductive coil 305 and the conductive coil 306, a respective compensation current value is added to the original target current. The three compensation current values shall satisfy the following conditions: when the currents of the conductive coil 304, the conductive coil 305 and the conductive coil 306 are the compensation current values respectively, the sum of magnetic torque exerted by the environmental magnetic field (mainly the geomagnetic field) on the permanent magnet disc 307 and the magnetic torque exerted by the three circular currents on the permanent magnet disc 307 should be zero.

Every 20 ms, the controller switches the control mode of controlling the conductive coil 304, the conductive coil 305 and the conductive coil 306 from the ordinary control mode to a PWM control mode lasting 1 ms.

Embodiment IV

A beam control apparatus includes a beam directing component and an electromagnetic field control component.

The electromagnetic field control component is shown, in FIG. 10 and FIG. 11. The FIG. 10 is a front view, and FIG. 11 is a rear view. The electromagnetic field control component is a transparent spherical shell 401 with an outer diameter of 10 mm and a thickness of 1 mm and made of transparent quartz glass. The interior of the transparent spherical shell 401 is a spherical cavity of the present invention, and the beam directing component is located therein. The transparent spherical shell 401 is embedded with a plurality of pieces of electrodes. The electrodes are located on the outer side of the spherical cavity of the transparent spherical shell; and the distances from the surface of the spherical cavity of the transparent spherical shell 401 to the electrodes are 0.05 mm. The thickness of each electrode is 0.2 mm. The electrodes are made of ITO, i.e. indium tin oxide, and are transparent. The shape of each electrode of the present invention is of a surface segmentation design same as a football. A total of 32 electrodes separated from one another are arranged. The electrode 405, the electrode 406, the electrode 415 and the electrode 416 are partially representatives of the electrodes. Two electrodes which, are centrosymmetric about the sphere center of the spherical cavity form one pair. For example, the electrode 405 and the electrode 415 form one pair, and the electrode 406 and the electrode 416 form one pair. One pair of electrodes is led out by two conductive wires (the conductive wires are not shown in FIG. 10 and FIG. 11) and is connected to one port of the controller. In the controller shown in FIG. 12, each long line and an adjacent short line are one port. The controller has 16 ports in total which are connected with the 16 pairs of electrodes of the electromagnetic field control component respectively.

As shown in FIG. 13, the beam directing component consists of a transparent spherical shell 402, an electrode pair 404 and a luminous element 409. The transparent spherical shell 402 has an outer diameter of 9.5 mm and is made of quartz glass. The luminous element 409 is fixed at the center of the transparent spherical shell 402. The electrode pair 404 is an electromagnetic moment component of the present invention and includes two separated electrodes. The two electrodes are symmetric about the sphere center of the transparent spherical shell 402. A connection line of the two electrodes is along the direction of the emergent beam, of the luminous, element 409. Each electrode of the electrode pair 404 is a plate in a shape of a circular part of a spherical shell. The circular outer diameter is 4 mm, the thickness of the plate is 0.1 mm, and a diameter of a middle through hole is 2.5 mm. The electrode is made of oxygen-free copper. The electrode pair 404 is embedded in the transparent spherical shell 402, and equidistant from the outer surface of the transparent spherical shell 402 with a distance of 0.05 mm. The through, hole in the middle of the electrode pair 404 is used for the emergent beam 410 emitted by the luminous element 409 to pass through. The two electrodes of the electrode pair 404 are connected with a positive pole and a negative pole of the luminous element 409 through two conductive wires 408.

The transparent spherical shell 402 of the beam directing component is located inside the transparent spherical shell 401 of the electromagnetic field control component. A clearance of a thickness of 0.25 mm exists between the transparent spherical shell 401 and the transparent spherical shell 402 and is filled with pure gasoline (the distilling range is about 150° C.).

The controller shown in FIG. 12 controls the charges on 32 electrodes of the electromagnetic field control component by controlling the voltage of 16 ports, thereby controlling an electric field in the spherical cavity of the electromagnetic field control component. The electric field generates inductive charges on the electrode pair 404 of the beam directing component. The inductive charges cause the electrode pair 404 to have an electric dipole moment, so that the beam directing component is driven by the rotation torque of the electric field in the spherical cavity, in a way that the beam direction of the beam directing component is along the direction of the electric field in the spherical cavity of the electromagnetic field control component. The inductive charges are used to generate a driving torque, i.e., the driving principle of the present embodiment is an electrostatic actuation based on a capacitance variable principle. According to different requirements of the directing precision and directing speed, a range of the port voltage outputted by the controller may be at levels of 10V, 100V or 1000V.

When the controller outputs the port voltage to control the electric field in the spherical cavity, a high-frequency AC voltage is added to the basic control voltage, and the frequency of the AC voltage is modulated with information by the controller. The AC voltage generates an inductive AC voltage on the electrode pair 404 and is, applied to the luminous element 409. The luminous element 409 has a modulation unit. The polarization state of the emergent beam 410 is controlled according to the information received electrically.

Embodiment V

Embodiment V is the same as embodiment IV except for the following two parts: 1, the electromagnetic moment component, i.e. the electrode pair 404 is replaced with an electrode pair 504 as shown in FIG. 14, which has no middle through hole, and is made of a transparent gaphene film. Two electrodes of the electrode pair 504 have precharged positive charges and negative charges respectively, and the voltage between the two electrodes is at a level of 1000 V.

The difference from embodiment IV is that the electric dipole moment of the electromagnetic moment component of the present embodiment is generated by the precharged charges rather than the induction of an electric field in the spherical cavity; 2, the conductive wire 408 is replaced with a photosensitive element 508. The photosensitive element is fixed with the beam directing component and electrically connected with the luminous element 409. The photosensitive element 508 receives an external optical signal, converts the optical signal to an electric signal, and transmits the electric signal to the luminous element 409. The luminous element 409 has a modulation unit. A wavelength and a phase of the emergent beam 410 are controlled according to the electric signal received.

Terms used in the present invention should be understood according to specifications and literal meanings. A part of the terms are explained in details herein.

"Direction" means a spatial attitude of an object, i.e., an orientation, azimuth or inclination and azimuth angle of the object.

The meaning of "direction of magnetic moment" is defined with reference to the physical standard. For a magnet, an approximate meaning is a direction of a connection line of south and north poles.

The meaning of "direction of electric dipole moment" is defined with reference to the physical, standard. For an electrode pair, an approximate meaning is a direction of a connection line of positive and negative electrodes.

Terms such as "a plurality of" and "multiple pairs" refer to that the number is not less than 2. Namely, "a plurality of" indicates two or more than two, and "multiple pairs" refers to two or more pairs.

"Encircled intensively" refers to that the conductive wires are encircled into one bundle or one circle or encircled together.

"Encircled dispersedly" refers to that the conductive wires are encircled in a spiral spacing manner, in a parallel spacing manner or in other interval spacing manner.

"Electrode pair" shall be understood as two electrodes.

"Electrically connected" shall be understood as connection via a conductor.

"Transparent" shall be understood as that the medium can allow the electromagnetic waves of the wavelength to transmit at least partially.

"Controller" may be a microelectronic control device, a control circuit, a computer, a PLC, a single chip microprocessor, an FPGA, an industrial controller, a mobile device, and other elements or apparatuses with a control capability.

The meaning of "function" refers to the definition of a function in mathematics and may be understood as that one quantity is determined by another quantity or other quantities according to a certain relationship.

"Spherical, shell" shall be understood as an object in-between two spherical surfaces with the same sphere center, or an object obtained by carving, adding or modifying on the base of that.

"Thickness" of a spherical shell refers to the thickness of the wall of the spherical shell.

The unit "T" is the unit Tesla of a magnetic flux density.

The meaning of "duty ratio" refers to definitions in related disciplines such as signal processing. In short, for signals with only two values, "duty ratio" refers to a proportion of the time when the signal takes a large value in a time segment. For a periodic signal, "duty ratio" means a ratio of time during which the signal takes a large value to a cycle time.

"Beams" should be understood as electromagnetic waves of which the propagation direction is parallel or within a cone of an angle less than 360 degrees. The light could be not only the visible light, but also electromagnetic waves of various realistic wavelengths such as infrared lights, ultraviolet lights, X-rays or microwaves.

The meaning of "target" in the words "target current" and "target magnetic field" is a command value of control, i.e., the state and value to be reached by control.

Based on the above principle, various modifications and variations may be achieved. The specific embodiments are selected and described to explain the disclosed principles and actual applications, so that various modified embodiments can be applied by those skilled in the art to fit the expected specific purposes to their best.

The specific embodiments of the present invention are not restrictive descriptions. Various technical features of the present invention may be combined according to the actual needs. Combination modes, structural design and parameter selections which are not listed in detail in the specific embodiments may be selected flexibly by those, ordinary skilled in the art according to actual conditions. However, any technical solution and technical design including the technical features of the present invention shall fall within the protection scope of the present invention.

INDUSTRIAL APPLICABILITY

The present invention provides a beam control apparatus which is simple in structure, free from maintenance and with little deflection angle limitation, so as to meet the needs for better beam direction control technologies in the fields of optical communications, unmanned driving, laser scanning, laser beam driving, optical routing and location identification.

I claim:

1. A beam control apparatus,
provided with a beam directing component and an electromagnetic field control component, wherein
the beam directing component is spherical in appearance shape; the electromagnetic field control component is, provided with a spherical cavity; and the beam directing component is located in the spherical cavity of the electromagnetic field control component and rotates relative to the electromagnetic field control component:
the beam directing component is provided with a luminous element, a reflective surface, a refractive medium or a diffraction grating; an emergent beam is obtained by virtue of the reflection of the luminous element, the reflection of the reflective surface, the refraction of the refractive medium or the diffraction of the diffraction grating; and
a direction of the emergent beam is determined by the orientation of the beam directing component;
the beam is an electromagnetic wave of predetermined wavelength; the beam directing component and the electromagnetic field control component are transparent or partially transparent in a beam waveband on a beam pathway;
the beam directing component is provided with an electromagnetic moment component; and the electromagnetic moment component generates an electric dipole moment or a magnetic moment;
the electromagnetic field control component is connected with the controller; the controller controls an electric field in the spherical cavity of the electromagnetic field control component to apply an electric torque to the electric bipole moment of the electromagnetic moment component of the beam directing component, or controls the magnetic field in the spherical cavity of the electromagnetic field control component to apply a magnetic torque to the magnetic moment of the electromagnetic moment component of the beam directing component, so as to control the direction of the beam directing component, thereby controlling the direction of the emergent beam.

2. The beam control apparatus according to claim 1, wherein the clearance between the beam directing component and the spherical cavity of electromagnetic field control component is filled with a lubricant; the lubricant is fluid or spherical particles; and the lubricant is transparent or partially transparent in the beam waveband.

3. The beam control apparatus according to claim 1, wherein the spherical cavity of the electromagnetic field control component is encircled with two or three groups of conductive coils; each group of conductive coils is mutually orthogonal and, insulated to each other; each group of conductive coils is electrically connected with a controller; the controller controls the current in each group of conductive coils to control a magnetic field in the spherical cavity; each group of conductive coils is formed by encircling at least one conductive wire; the conductive wires of the same group of conductive coils are identical in encircling directions and are intensively or dispersedly encircled; and a ratio of a total conductive sectional area of each group of conductive coils to an inner surface area of the spherical cavity is not greater than 0.02.

4. The beam control apparatus according to claim 3, wherein the electromagnetic moment component of the beam directing component is a permanent magnet; and the permanent magnet generates the magnetic moment.

5. The beam control apparatus according to claim 3, wherein besides the beam directing component and the electromagnetic field control component, the beam control apparatus is also provided with a magnetometer; the magnetometer detects a value of an environmental magnetic field; and the controller controls the magnetic field generated by the electromagnetic field control component in the spherical cavity, so that the generated magnetic field in the spherical cavity is equal to the target magnetic field in the spherical cavity minus the environmental magnetic field, thereby offsetting the effect of the environmental magnetic field on the magnetic field of the spherical cavity.

6. The beam control apparatus according to claim 1, wherein the outer side of the spherical cavity of the electromagnetic field control component is coated with multiple pairs of electrodes; each pair of electrodes is electrically connected with the controller; the controller controls the voltage of each pair of electrodes to control the electric field in the spherical cavity; and the electrodes are transparent or partially transparent in the beam waveband on the beam pathway.

7. The beam control apparatus according to claim 6, wherein the electromagnetic moment component of the beam directing component is a pair of electrodes or multiple pairs of electrodes; the electrodes are transparent or partially transparent in the beam waveband on the beam pathway; each pair of electrodes is insulated to other portions of the present invention; each pair of electrodes comprises two electrodes located on the inner side of the spherical surface of the beam directing component and a conductor connecting the two electrodes, thereby inducing the electric dipole moment in the electric field.

8. The beam control apparatus according to claim 6, wherein the electromagnetic moment component of the beam directing component is a pair of electrodes or multiple pairs of electrodes; the electrodes are transparent or partially transparent in the beam waveband on the beam pathway, each pair of electrodes is insulated to other portions of the present invention; each pair of electrodes comprises, two electrodes located on the inner side of the spherical surface of the beam directing component, and the two electrodes are mutually insulated to each other and have an equal amount of opposite charges, thereby generating the electric dipole moment.

9. The beam control apparatus according to claim 7, wherein each electrode of the, beam directing component is circular or regularly polygonal; and the surface area of each electrode is greater than 0.5% of the area of the outer spherical surface of the beam directing component;
- a distance from each electrode of the beam directing component to the spherical outer surface of the beam directing component is less than 1 mm; and a distance from each electrode of the electromagnetic field control component to the inner surface of the spherical cavity is less than 1 mm;
- the electrodes of the electromagnetic field control component and the beam directing component are made of indium tin oxide (ITO), indium zinc oxide (IZO), a graphite film, or a metal film.

10. The beam control apparatus according, to claim 1, wherein the beam directing component has a reflection surface; the reflection surface is a plane mirror, a concave mirror or a convex mirror; the reflection surface is located in the middle part of the beam directing component: and the reflection surface is perpendicular to a direction of the electric dipole moment or magnetic moment of the electromagnetic moment component of the beam directing component.

11. The beam control apparatus according to claim 1, wherein the beam directing component has a luminous element; the emergent beam is emitted by the luminous element; the direction of the emergent beam is parallel to the direction of the electric dipole moment or the direction of the magnetic moment of the electromagnetic moment component of the beam directing component; the beam directing component also has a photosensitive element capable of receiving an optical signal, a magnetic field induction coil capable of receiving a magnetic field signal or an electric field induction antenna capable of receiving an electric field signal; the luminous element is connected with the photosensitive element, the magnetic field induction coil or the electric field induction antenna; and the luminous element controls the intensity, wavelength, phase or polarization state of the emergent beam according to the optical signal received by the photosensitive element, the magnetic field signal received, by the magnetic field induction coil or the electric field signal received by the electric field induction antenna.

12. The beam control apparatus according to claim 1, wherein the electromagnetic field control component controls the electric field or magnetic field in the spherical cavity in a pulse width modulation mode, i.e. a PWM mode.

13. The beam control apparatus according to claim 1, wherein besides the beam directing component and the electromagnetic field control component, the beam control apparatus also has a beam direction detection component: the direction of one or a plurality of external incoming light beams are detected by the beam direction detection component; and the controller controls the beam control apparatus, in a way that the direction of the emergent beam is a specific function of the direction of the external incoming light beams.

14. The beam control apparatus according to claim 2, wherein a difference between an outer diameter of the beam directing component and an inner diameter of the spherical cavity of the electromagnetic field control component is less than 2 mm; a distance between the gravity center and a sphere center of the beam directing component is less than 10% of the outer diameter; and a ratio of an average density of the beam directing component to the density of the lubricating medium is 0.9 to 1.1.

15. The beam control apparatus according to claim 8, wherein each electrode of the beam directing component is circular or regularly polygonal; and the surface area of each electrode is greater than 0.5% of the area of the outer spherical surface of the beam directing component;
- a distance from each electrode of the beam directing component to the spherical outer surface of the beam directing component is less than 1 mm; and a distance from each electrode of the electromagnetic field control component to the inner surface of the spherical cavity is less than 1 mm;
- the electrodes of the electromagnetic field control component and the beam directing component are made of indium tin oxide (ITO), indium zinc oxide (IZO), a graphite film, or a metal film.

* * * * *